US012675982B2

(12) United States Patent
Shin et al.

(10) Patent No.: US 12,675,982 B2
(45) Date of Patent: Jul. 7, 2026

(54) VIDEO PROCESSING METHOD USING TRANSFER LEARNING AND PRE-TRAINING SERVER

(71) Applicant: KOREA ELECTRONICS TECHNOLOGY INSTITUTE, Seongnam-si (KR)

(72) Inventors: Sa Im Shin, Seoul (KR); Jung Ho Kim, Seoul (KR); Bo Eun Kim, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 399 days.

(21) Appl. No.: 18/368,600

(22) Filed: Sep. 15, 2023

(65) Prior Publication Data

US 2024/0096071 A1    Mar. 21, 2024

(30) Foreign Application Priority Data

Sep. 20, 2022    (KR) ........................ 10-2022-0118520

(51) Int. Cl.
*G06V 10/774*       (2022.01)
*G06T 7/246*        (2017.01)
(Continued)

(52) U.S. Cl.
CPC .......... *G06V 10/7747* (2022.01); *G06T 7/251* (2017.01); *G06V 10/255* (2022.01);
(Continued)

(58) Field of Classification Search
CPC . G06T 2207/20081; G06T 2207/20084; G06T 2207/30196; G06T 7/00;
(Continued)

(56) References Cited

U.S. PATENT DOCUMENTS 11,270,124 B1 *   3/2022   Carvalho ................ G06V 20/41
11,482,048 B1 *  10/2022   Diaz-Arias ............ G16H 30/40
(Continued)

FOREIGN PATENT DOCUMENTS

CN     111002292    *   4/2020   ............ B25J 9/0081
CN     113408455    *   9/2021   ......... G06F 18/2415
(Continued)

*Primary Examiner* — Zhiyu Lu
(74) *Attorney, Agent, or Firm* — Revolution IP, PLLC

(57)    ABSTRACT

There is provided a video processing method performed by a computing device, the method including the steps of: collecting video from an external device; generating pre-processed data by extracting two-dimensional or three-dimensional skeleton information from the video; pre-training a first artificial intelligence model including N
(Continued)

transformer blocks from the preprocessed data by applying an attention from a body of an object to a plurality of joints, an attention from each of the plurality of joints to the body, and an attention between persons; and learning, when parameters determined as a result of the pre-training of the first artificial intelligence model are transferred, a method of recognizing an action from the video received from the external device, using a second artificial intelligence model including the N transformer blocks on the basis of the parameters, wherein N is a natural number equal to or larger than 2.

6 Claims, 6 Drawing Sheets

(51) Int. Cl.
   *G06V 10/20*        (2022.01)
   *G06V 10/82*        (2022.01)
   *G06V 10/94*        (2022.01)
   *G06V 20/40*        (2022.01)
   *G06V 40/20*        (2022.01)
(52) U.S. Cl.
   CPC .............. *G06V 10/82* (2022.01); *G06V 10/95* (2022.01); *G06V 20/46* (2022.01); *G06V 40/23* (2022.01); *G06T 2207/20081* (2013.01); *G06T 2207/20084* (2013.01); *G06T 2207/30196* (2013.01)

(58) Field of Classification Search
   CPC .. G06T 7/251; G06V 10/255; G06V 10/7747; G06V 10/82; G06V 10/95; G06V 20/46; G06V 40/171; G06V 40/20; G06V 40/23
   See application file for complete search history.

(56)              References Cited

U.S. PATENT DOCUMENTS

| | | | | |
|---|---|---|---|---|
| 2022/0051061 | A1* | 2/2022 | Chi | ..................... G06V 10/764 |
| 2022/0383639 | A1* | 12/2022 | Javan Roshtkhari | ........................ G06N 3/0464 |
| 2023/0196841 | A1* | 6/2023 | Min | ....................... G06V 10/22 382/103 |
| 2023/0368578 | A1* | 11/2023 | Diaz-Arias | ............... G06T 7/75 |

FOREIGN PATENT DOCUMENTS

| | | | | | |
|---|---|---|---|---|---|
| CN | 113425290 | * | 9/2021 | ............. | G06T 11/23 |
| CN | 114386582 | * | 4/2022 | ............. | G06N 3/044 |
| CN | 114708649 | * | 7/2022 | ............. | G06V 40/20 |
| CN | 114818989 | * | 7/2022 | ............. | G06F 18/24 |
| CN | 112257534 | * | 8/2022 | ............. | G06N 3/045 |
| CN | 114998525 | * | 9/2022 | ............... | G06N 3/08 |
| CN | 115147676 | * | 10/2022 | ............. | G06V 40/20 |
| CN | 115359550 | * | 11/2022 | ............. | G06V 40/25 |
| CN | 113240714 | * | 10/2023 | ............. | G06T 7/248 |
| CN | 114821804 | * | 3/2025 | ............. | G06V 40/20 |
| JP | WO2023066536 | * | 4/2023 | ............. | G06V 10/44 |
| JP | 2023111554 | * | 8/2023 | ............. | G06V 10/82 |

* cited by examiner

FIG. 5

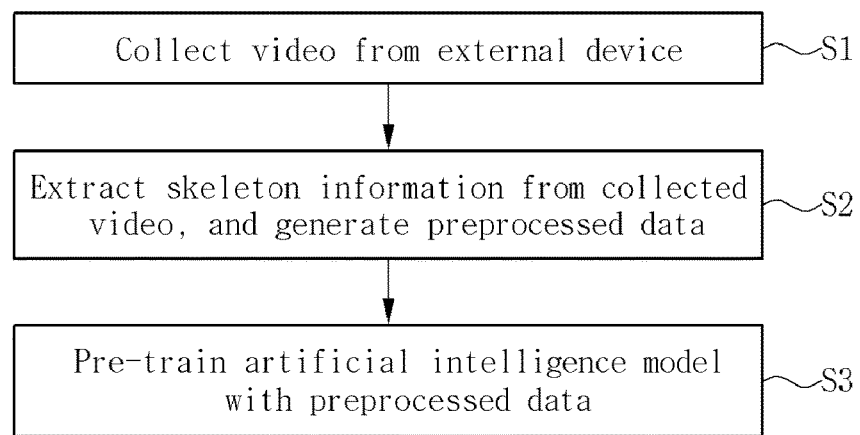

```
┌─────────────────────────────────────────┐
│      Collect video from external device   │──S1
└─────────────────────────────────────────┘
                    │
                    ▼
┌─────────────────────────────────────────┐
│  Extract skeleton information from collected │──S2
│    video, and generate preprocessed data  │
└─────────────────────────────────────────┘
                    │
                    ▼
┌─────────────────────────────────────────┐
│   Pre-train artificial intelligence model  │──S3
│         with preprocessed data            │
└─────────────────────────────────────────┘
```

FIG. 6

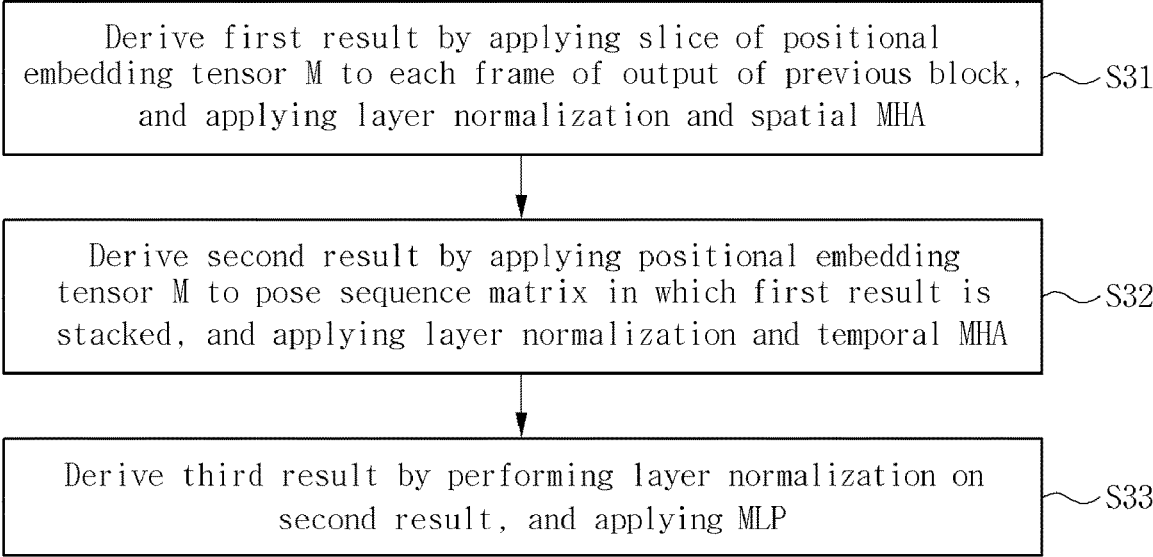

```
┌──────────────────────────────────────────────────┐
│      Derive first result by applying slice of positional │
│  embedding tensor M to each frame of output of previous block, │──S31
│      and applying layer normalization and spatial MHA  │
└──────────────────────────────────────────────────┘
                         │
                         ▼
┌──────────────────────────────────────────────────┐
│    Derive second result by applying positional embedding │
│  tensor M to pose sequence matrix in which first result is │──S32
│  stacked, and applying layer normalization and temporal MHA │
└──────────────────────────────────────────────────┘
                         │
                         ▼
┌──────────────────────────────────────────────────┐
│  Derive third result by performing layer normalization on │──S33
│         second result, and applying MLP            │
└──────────────────────────────────────────────────┘
```

Displacement of poses in different frame intervals

VIDEO PROCESSING METHOD USING TRANSFER LEARNING AND PRE-TRAINING SERVER

BACKGROUND OF THE INVENTION

Field of the Invention

The present invention relates to a video processing method using transfer learning and a pre-training server. More specifically, the present invention relates to a method of processing unlabeled video data using transfer learning, and a server therefor.

BACKGROUND OF THE RELATED ART

Video analysis techniques based on artificial intelligence conventionally have a problem in that a model suitable for each purpose and a large amount of data required for each purpose should be separately constructed and learned.

However, although video processing techniques such as analysis, detection, prediction, and the like of video are used most usefully in the field of visual intelligence, there is a difficulty in securing large amounts of data due to the problem of privacy or the like.

In addition, in skeleton-based motion recognition, unsupervised learning techniques for pre-training are intensively developed recently to avoid the limitation in the cost and time of supervised learning.

SUMMARY OF THE INVENTION

An object of the present invention is to provide a method and device for providing a general-purpose artificial intelligence model that can be applied to various purposes.

The technical problems of the present invention are not limited to the technical problems mentioned above, and unmentioned other technical problems will be clearly understood by those skilled in the art from the following description.

To accomplish the above object, according to one aspect of the present invention, there is provided a video processing method performed by a computing device, the method comprising the steps of: collecting video from an external device; generating preprocessed data by extracting two-dimensional or three-dimensional skeleton information from the video; pre-training a first artificial intelligence model including N transformer blocks on the basis of the preprocessed data by applying an attention from a body of an object to a plurality of joints, an attention from each of the plurality of joints to the body, and an attention between persons; and learning, when parameters determined as a result of the pre-training of the first artificial intelligence model are transferred, a method of recognizing an action from the video received from the external device, using a second artificial intelligence model including the N transformer blocks on the basis of the parameters, wherein N is a natural number equal to or larger than 2.

The step of pre-training a first artificial intelligence model may include the steps of: applying a slice of a positional embedding tensor corresponding to each frame of an output of a previous block, and performing first layer normalization, by an n-th transformer block among the N transformer blocks; applying a spatial multi-head attention (MHA) to a result of the first layer normalization, by the n-th transformer block; and deriving a first result by adding a result of applying the slice of a positional embedding tensor corresponding to each frame of an output of a previous block to a result of applying the spatial MHA, by the n-th transformer block, wherein n is a natural number between 2 and N.

The video processing method may further comprise the steps of: applying a matrix with a changed dimension of the positional embedding tensor to a pose sequence matrix in which the first result corresponding to each frame is stacked, and performing second layer normalization; applying a temporal MHA to a result of the second layer normalization; and deriving a second result by adding a result of applying the matrix with a changed dimension of the positional embedding tensor to a pose sequence matrix to a result of applying the temporal MHA.

The video processing method may further comprise the steps of: performing third layer normalization on the second result; applying a multi-layer perceptron (MLP) to a result of the third layer normalized; and deriving a third result by adding the second result to a result of applying the MLP.

The video processing method may further comprise the step of deriving a motion sequence representation for an input motion sequence according to the video, by an N-th block among the N transformer blocks.

According to another embodiment of the present invention, there is provided a pre-training server comprising: a processor; a memory; and a computer program loaded on the memory and executed by the processor, wherein the computer program includes: an instruction for collecting video from an external device; an instruction for generating preprocessed data by extracting two-dimensional or three-dimensional skeleton information from the video; an instruction for pre-training a first artificial intelligence model including N transformer blocks from the preprocessed data by applying an attention from a body of an object to a plurality of joints, an attention from each of the plurality of joints to the body, and an attention between persons; and an instruction for recognizing, when parameters and weights of the pre-trained first artificial intelligence model are transferred, an action from the video received from the external device, using a second artificial intelligence model that uses the parameters and weights, wherein N is a natural number equal to or larger than 2.

According to another embodiment of the present invention, there is provided a pre-training server comprising a processor coupled to a memory that stores program codes, wherein the processor performs unsupervised training on an artificial intelligence model using an unlabeled input motion sequence, and the artificial intelligence model includes N transformer blocks that apply an attention from a body of an object to a plurality of joints, an attention from each of the plurality of joints to the body, and an attention between persons, wherein each of the N transformer blocks includes: a spatial MHA module for fusing joint-to-joint information, joint-to-body information, and body-to-body information of an object within each frame, and learning fused spatial dependency through an attention operation; and a temporal MHA module for learning temporal dependency across the sequence using pose features aggregated by the spatial MHA module through an attention operation, wherein N is a natural number equal to or larger than 2.

Each n-th transformer block among the N transformer blocks may perform first layer normalization on a result of applying a slice of a positional embedding tensor corresponding to each frame of an output of a previous block, and the spatial MHA module may apply a spatial MHA to a result of the first layer normalization, wherein n is a natural number between 2 and N.

Each n-th transformer block may derive a first result by adding a result of applying the slice of a positional embedding tensor corresponding to each frame of an output of a previous block to a result of applying the spatial MHA, and apply a matrix with a changed dimension of the positional embedding tensor to a pose sequence matrix in which the first result corresponding to each frame is stacked, and performs second layer normalization, and the temporal MHA module may apply a temporal MHA to a result of the second layer normalization.

Each n-th transformer block may derive a second result by adding a result of applying the matrix with a changed dimension of the positional embedding tensor to a pose sequence matrix to a result of applying the temporal MHA, perform third layer normalization on the second result, apply a multi-layer perceptron (MLP) to a result of the third layer normalized, and derive a third result by adding the second result to a result of applying the MLP.

The present invention can be applied to various fields with one general-purpose model.

In addition, since the present invention uses one general-purpose model, transfer learning according to each purpose can be performed with only a small amount of data.

The effects of the present invention are not limited to the effects mentioned above, and unmentioned other effects will be clearly understood by those skilled in the art from the following description.

BRIEF DESCRIPTION OF THE DRAWINGS

FIG. 5 is a flowchart illustrating a video processing method according to an embodiment.

FIG. 6 is a flowchart showing step S3 in FIG. 5 in detail.

DETAILED DESCRIPTION OF THE PREFERRED EMBODIMENT

Figure 1:
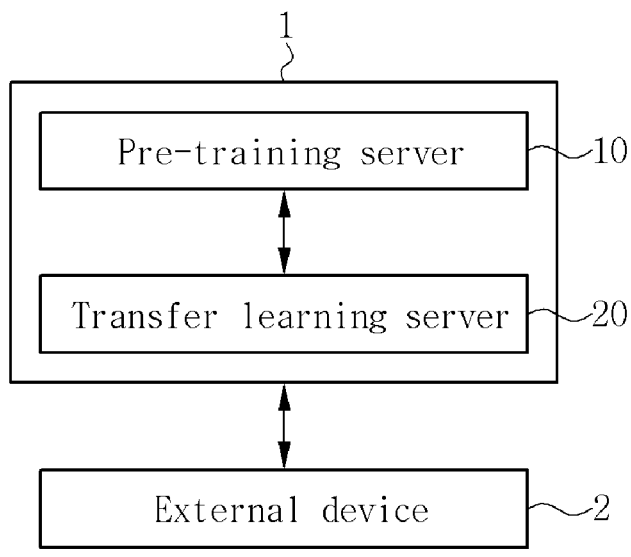
FIG. 1 is a block diagram schematically showing a video processing system according to an embodiment of the present invention.

The present invention may be implemented to be variously modified without departing from the spirit of the present invention, and may have one or more embodiments. In addition, in the present invention, the embodiments described in "specific details for carrying out the invention" and "drawings" are examples for explaining the present invention in detail, and do not restrict or limit the scope of the present invention.

Accordingly, that those skilled in the art may easily infer from the "specific details for carrying out the invention" and "drawings" of the present invention may be interpreted as falling within the scope of the present invention.

In addition, the size and shape of each component shown in the drawings may be exaggerated for description of the embodiments, and do not limit the size and shape of the actually embodied invention.

Unless the terms used in the specification of the present invention are specifically defined, they may have the same meaning as the terms generally understood by those skilled in the art.

When a component (e.g., a first component) is mentioned to be "operatively or communicatively coupled with/to" or "connected to" another component (e.g., a second component), it should be understood that any one of the components may be directly connected to the other component or may be connected through another component (e.g., a third component). On the other hand, when a component (e.g., a first component) is mentioned to be "directly coupled" or "directly connected" to another component (e.g., a second component), it may be understood that no other component (e.g., a third component) exists between the component and the other component. The expression "configured to" used in the specification may be used to be interchangeable, according to a situation, with, for example, "suitable for", "having the capacity to", "designed to", "adapted to", "made to", "capable of", or the like. The term "configured (or set) to" may not necessarily mean "specifically designed to" in hardware. Instead, in some situations, the expression "a device configured to" may mean that the device is "capable of" together with other devices or components. For example, the phrase "sub-processor configured (or set) to perform A, B, and C" may mean a dedicated processor (e.g., an embedded processor) for performing corresponding operations, or a generic-purpose processor (e.g., CPU or application processor) capable of performing corresponding operations by executing one or more software programs stored in a memory device. Electronic devices according to various embodiments of the specification may be implemented as at least one server, but this is only an example and may be implemented as a user terminal device or a home appliance. The artificial intelligence model according to the present disclosure may be configured of a plurality of neural network layers. Each layer has a plurality of weight values, and performs operations of the layer through operation results of previous layers and operations of the plurality of weight values. Examples of the neural network include Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), and Deep Q-Network, and the neural network in this disclosure is not limited to the examples described above except the cases explicitly stated. A learning algorithm is a method of training a predetermined target device (e.g., a robot) using a large amount of learning data so that the target device may make decisions or make predictions of its own. Examples of the learning algorithm include supervised learning, unsupervised learning, semi-supervised learning, and reinforcement learning, and the learning algorithms in the present disclosure are not limited to the examples described above except the cases explicitly stated.

Hereinafter, embodiments of the present invention will be described in detail with reference to the drawings.

FIG. 1 is a block diagram schematically showing a video processing system according to an embodiment of the present invention.

A video processing system 1 according to an embodiment may include a pre-training server 10 and a transfer learning server 20. The pre-training server 10 and the transfer learning server may exchange signals with each other through communication. The pre-training server 10 may transmit and receive data to and from an external device 2.

The pre-training server 10 may train an artificial intelligence model using video data received from the external device 2. An artificial intelligence model according to an embodiment may perform a method of extracting motion features of an object from the video data. Here, learning of a pre-training model is called pre-training to distinguish it from training of the transfer learning server 20. Here, the object means a target for which the video processing system 1 desires to process motion features, such as a person, an animal, or an object included in the video data.

The pre-training server 10 may transfer the pre-trained artificial intelligence model to the transfer learning server 20. The transfer learning server 20 may apply the pre-trained artificial intelligence model to each of a plurality of tasks.

The pre-training server 10 may recognize motions of an object on the basis of a skeleton. The artificial intelligence model may be implemented using a structure based on a transformer.

Figure 2:
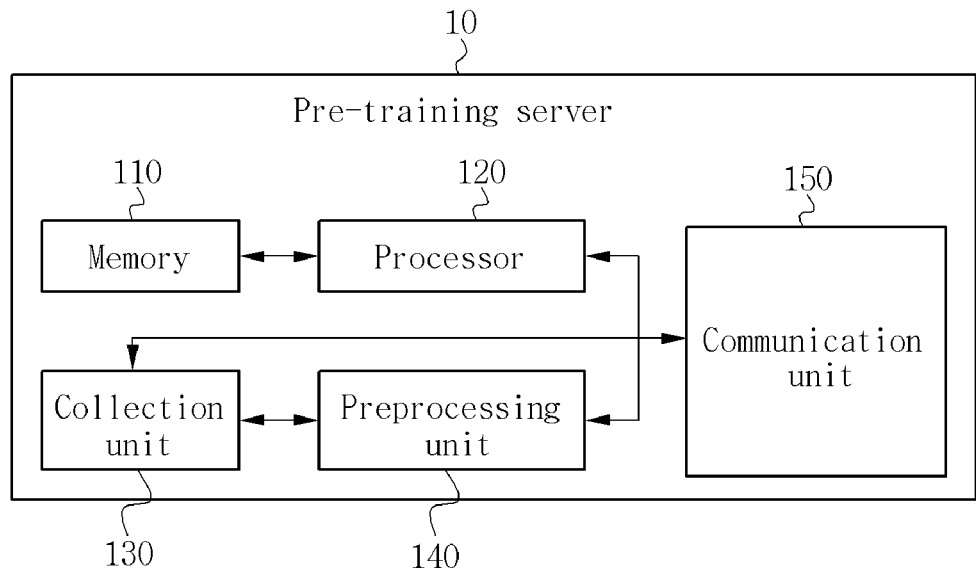
FIG. 2 is a block diagram schematically showing the detailed configuration of the pre-training server in FIG. 1.

FIG. 2 is a block diagram schematically showing the detailed configuration of the pre-training server in FIG. 1.

The pre-training server 10 may include a memory 110 and a processor 120. The memory 110 may store instructions or data for executing at least one program related to at least one other component of the pre-training server 10. The memory 110 may be implemented as non-volatile memory, volatile memory, flash-memory, hard disk drive (HDD), or solid-state drive (SSD). The memory 110 is accessed by the processor 120, and the processor 120 may read, write, modify, delete, and update data. In the present disclosure, the term memory refers to the memory 110, ROM (not shown) in the processor 120, RAM (not shown), or a memory card (not shown) (e.g., micro-SD card, memory stick) mounted on an electronic device. In particular, the memory 110 may store programs for executing an artificial intelligence agent. At this point, the artificial intelligence agent is a personalized program for providing various services to the pre-training server 100.

Functions related to artificial intelligence according to the present disclosure are operated through the processor 120 and the memory 110. The processor 120 may be implemented as a System on Chip (SoC) or a large-scale integration (LSI) embedded with a processing algorithm, or may be implemented in the form of a Field Programmable Gate Array (FPGA). The processor 120 may execute instructions stored in the memory 110. The processor 120 may be configured to include a Central Processing Unit (CPU), Micro Processor Unit (MPU), Micro Controller Unit (MCU), Graphic Processing Unit (GPU), or any other type of processor well known in the technical field of the present invention. In addition, the processor 120 may perform operations for at least one application or program to execute the methods according to the embodiments of the present invention. Although it is shown in FIG. 2 that only one processor 120 is provided, the present invention is not limited thereto, and the processor 120 may include a plurality of processors. The processor 120 is not limited to the term, and may be a general-purpose processor such as a CPU, an AP, or the like, a processor dedicated to graphics such as a GPU, a VPU, or the like, or a processor dedicated to artificial intelligence such as an NPU. The processor 120 controls to process input data according to predefined operation rules or artificial intelligence models stored in the memory 110. The predefined operation rules or artificial intelligence models are characterized as being generated through learning. Here, being generated through learning means that a predefined operation rule or an artificial intelligence model with desired characteristics is generated by applying a learning algorithm to a large number of learning data. Learning of the artificial intelligence model may be performed in a device itself in which the artificial intelligence according to the present disclosure is performed, or may be performed through a separate server or system.

The pre-training server 100 may include a collection unit 130 for collecting video data from the external device 2 and a preprocessing unit 140 for preprocessing the video data received from the collection unit 130. The communication unit 150 may communicate with each of the transfer learning server 20 and the external device 2 to exchange data or signals.

The processor 120 may perform unsupervised learning of an artificial intelligence model using an unlabeled motion sequence. In an embodiment, a mechanism capable of a global-local attention and a person-person attention and a pre-training method using the same are provided.

In the pre-training method of an artificial intelligence model, the processor 120 may train a GL-transformer to effectively model local and global attentions and generate a representation of an input motion sequence suitable for downstream action recognition tasks. The processor 120 may separate global translation from the input data and arrange a sequence to allow an attention between two persons.

When the pre-trained artificial intelligence model is transferred, the transfer learning server 20 may perform various downstream tasks using the pre-trained artificial intelligence model.

Figure 3:
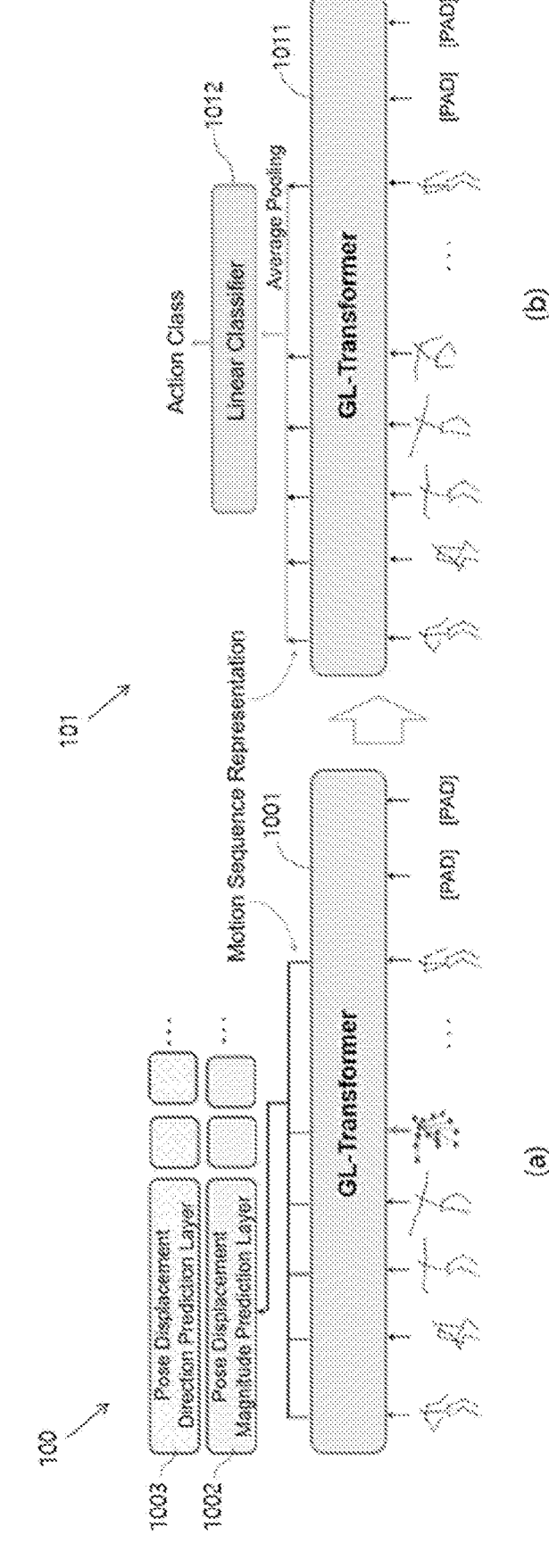
FIG. 3 illustrates views (a) and (b) for explaining the configuration of the framework of a video processing system according to an embodiment.

FIGS. 3(*a*) and 3(*b*) are views for explaining the configuration of the framework of a video processing system according to an embodiment. FIG. 3(*a*) shows the pre-training server 10 that performs unsupervised pre-training on an artificial intelligence model 100, and FIG. 3(*b*) shows an artificial intelligence model 101 used by the transfer learning server 20 for downstream tasks.

The pre-training server 10 pre-trains the artificial intelligence model 100, i.e., a transformer-based model, using an unlabeled motion sequence. As a result of the pre-training, the artificial intelligence model 100 may generate an appropriate motion representation required for action recognition. Data output from a GL-transformer 1011 may be transferred to a linear classifier 1012 after average pooling is applied to the motion sequence representation on the time axis. The linear classifier 1012 is connected behind the GL-transformer 1011.

Referring to FIG. 3(*a*), the artificial intelligence model 100 may be implemented as a transformer (GL-Transformer, Global-Local-Transformer) model using global and local attentions. The artificial intelligence model 100 may include a GL-Transformer layer 1001, a Pose Displacement Magnitude Prediction Layer 1002, and a Pose Displacement Direction Prediction Layer 1003. The artificial intelligence model 100 may capture all joint dynamics of the skeleton by learning both the global and local attentions of a video through the GL-transformer layer 1001.

In a downstream task, the transfer learning server 20 may perform action recognition through an artificial intelligence model 101 using the pre-trained artificial intelligence model 100. When the pre-training server 10 pre-trains the artificial intelligence model 100, the transfer learning server 20 may be used for various tasks using the artificial intelligence model 101. Although the GL-transformer layer used by the transfer learning server 20 is the same as the learned GL-transformer layer 1001, hereinafter, it is referred to as the GL-transformer layer 1011 for convenience of explanation.

Referring to FIG. 3(*b*), the artificial intelligence model 101 may include the GL-transformer layer 1011 and the linear classifier 1012. Although it is shown in FIG. 3(*b*) that the artificial intelligence model 101 includes one linear classifier 1012, the present invention is not limited thereto, and the linear classifier 1012 may include at least one layer. The at least one layer may be implemented as various types of networks, such as a Convolutional Neural Network (CNN), Recurrent Neural Network (RNN), Graph Neural Network (GNN), and the like.

Figure 4:
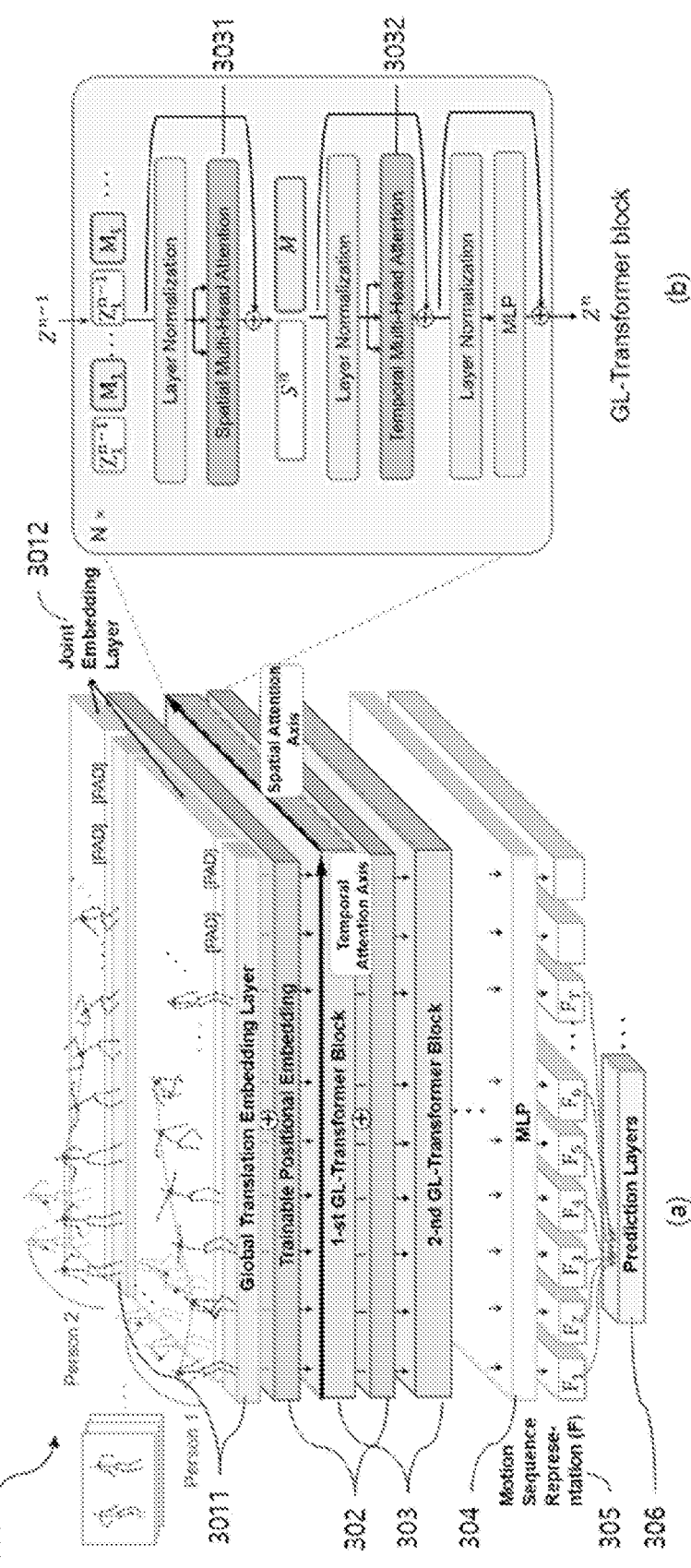
FIG. 4 illustrates block diagrams (a) and (b) schematically showing the architecture of an artificial intelligence model according to an embodiment.

FIGS. 4(*a*) and 4(*b*) are block diagrams schematically showing the architecture of an artificial intelligence model according to an embodiment.

The artificial intelligence model 100 in FIG. 3(*a*) may be implemented as the artificial intelligence model 300 in FIG. 4(*a*). The pre-training server 10 may pre-train the artificial intelligence model 300.

Referring to FIG. 4(*a*), the artificial intelligence model 300 may be configured of a global translation embedding layer 3011, a joint embedding layer 3012, a trainable positional embedding 302, n GL-transformer blocks 303, a multi-layer perceptron (MLP) 304, a motion sequence representation 305, and a prediction layer 306. Here, N is a natural number equal to or greater than 2.

Referring to FIG. 4(*b*), each of the N GL-transformer blocks 303 may include a spatial multi-head attention (MHA) module 3031 and a temporal MHA module 3032. The spatial MHA module and the temporal MHA module correspond to the N GL-transformer blocks 303, respectively.

Here, the prediction layer 306 may be learned to be specific to a task to produce a result suitable for an output value. The prediction layer 306 may include a plurality of layers. The N GL-transformer blocks 303 in FIG. 4(*b*) may correspond to the GL-transformer 1001 in FIG. 3(*a*), and the prediction layer 306 in FIG. 4(*a*) may include the pose displacement magnitude prediction layer 1002 and the pose displacement direction prediction layer 1003 in FIG. 3(*a*).

The prediction layer 306 is used when the pre-training server 10 pre-trains and may be removed from the transfer learning server 20 corresponding to downstream. An embodiment is intended to generate a general-purpose model that can be applied to various tasks. Accordingly, the pre-training server 10 pre-trains the artificial intelligence model 300 including the prediction layer 306, and after the pre-training is completed, the transfer learning server 20 trains the artificial intelligence model 101 including the linear classifier 1012 in FIG. 3(*b*), instead of the prediction layer 306.

Each of the N GL-transformer blocks 303 includes a spatial MHA module and a temporal MHA module. Hereinafter, common operations and characteristics of a spatial MHA module and a temporal MHA module corresponding to each of the N GL-transformer blocks 303 will be comprise of the spatial MHA module 3031 and the temporal MHA module 3032.

Each of the N GL-transformer blocks 303 may apply an attention from the body of an object to a plurality of joints, an attention from each of the plurality of joints to the body, and an attention between persons. The spatial MHA module 3031 may fuse joint-to-joint information, joint-to-body information, and body-to-body information of an object within each frame, and learn the fused spatial dependency through an attention operation.

The temporal MHA module 3032 may learn the temporal dependency across the sequence using pose features aggregated by the spatial MHA module 3031 through an attention operation.

Hereinafter, the architecture of the artificial intelligence model 300 will be described with reference to the input motion sequence that is input into the artificial intelligence model 300.

The spatial MHA module 3031 may perform three types of attentions using an input body motion that separates global body motions and local joint motions. One is a local (between joints) attention, another one is an attention from global (body) to local (joint) and/or an attention from local (joint) to global (body), and the other one is an attention from global (person) to global (person). Hereinafter, the input motion sequence is assumed to be a sequence of an input body motion.

The temporal MHA module 3032 may perform global and local attentions between two frames for the sequence of all persons.

In this way, a global and local attention mechanism may be implemented in both the spatial MHA and the temporal MHA of each of the N GL-transformer blocks.

The input motion sequence input into the artificial intelligence model 100 may be represented as two types of information including global translational motion of the body and local motion of body joints. The global translational motion may be represented as a trajectory of the center joint of the body, and the local motion may be represented as relative movements of a joint of the body from the center joint. Here, the center joint may be defined in each dataset. For example, NTU dataset [28, 19] represents the spinal joint as the center joint.

Hereinafter, a method of processing a video by the video processing system 1 through pre-training will be described with reference to FIG. 5.

FIG. 5 is a flowchart illustrating a video processing method according to an embodiment.

Referring to FIG. 5, the collection unit 130 may collect video from the external device 2 (S1). The external device 2 may be a photographing device that captures a predetermined area and generates a video for the predetermined area. The video may be a video configured in RGB. The collection unit 130 may receive the captured video and transmit it to the preprocessing unit 140.

The preprocessing unit 140 may generate preprocessed data by preprocessing the collected video (S2). The preprocessing unit 140 may extract two-dimensional or three-dimensional skeleton information from the video. Extraction of skeleton may be implemented by an existing skeleton extraction algorithm. The preprocessed data may be implemented as tensor X. Tensor X includes three-dimensional position information for each joint of an object included in the video.

The processor 120 may train the artificial intelligence model 100 using the preprocessed data as learning data (S3). The processor 120 may train the artificial intelligence model 100 using a transformer-based model that applies an attention from a global (body) of an object to a local (joint), an attention from a local (joint) to the global (body), and an attention between a global (person) and a global (person).

Therefore, the original three-dimensional skeleton motion sequence may be expressed as tensor $X=[X_1, X_2, \ldots, X_T]^T$. Here, $X_T$ is a matrix representing the pose of the skeleton in the t-th frame (t is a natural number).

Pose matrix $X_T$ may be defined as $X_T=[q_t^1, q_t^2, \ldots, q_t^K]^T$ (k is a natural number), where $q_t^K \in R^3$ represents a three-dimensional vector corresponding to the k-th joint.

Relative position $r_t^k$ at the k-th joint is $r_t^k=q_t^k-q_t^c$. Here, $q_t^c$ represents the coordinates of the center joint.

The t-th frame of the local motion may be expressed as matrix $R_x$ using the relative joint position. $R_t=[r_t^1, \ldots, r_t^K]^T$ Here, $r_t^k=(0,0,0)$ may be deleted and re-indexed to a K−1-dimensional matrix. $R_t=[r_t^1, \ldots, r_t^{K-1}]^T$ The t-th frame of the global translational motion may be calculated using vector $g_t=g_t^c-g_0^c$. Referring to FIG. 4, $g_t$ and $$r_t^k$$

may be projected to a D-dimensional embedding vector as shown in [Equation 1].

$$\bar{g}_t = W_g g_t + b_g, \bar{r}_t^k = W_r r_t^k + b_r, k = 1, \cdots, K-1 \quad \text{[Equation 1]}$$

where, $W_g$, $W_r \in R^{(D\times3)}$ and $b_g$, $b_r \in R^{(D\times1)}$, represent trainable weights and biases in the global translation embedding layer 3011 and the joint embedding layer 3012, respectively.

In the case of an action dataset containing interactions between two or more persons, vector $g_t$ and matrix $R_t$ may be represented as $g_{t,p}$ and $R_{t,p}$, respectively. Here, p denotes the index of a person.

Similarly, embedding vectors may be expressed as $\bar{g}_{t,p}$ and $r^{-k}_{t,p}$, respectively.

Hereinafter, a method of considering interactions between several persons in a sequence will be described.

The artificial intelligence model 100 may learn time information of both temporal frames and spatial joints from training data by extending the concept of a positional embedding matrix containing information on the order of a sequence and adopting a trainable spatial-temporal positional embedding tensor M.

Here, $M \in R^{T\times PK\times D}$. PK denotes the dimension of joint indices of P persons, and D denotes the dimension of the embedding vectors and is the same as the dimension (D) of $\bar{g}_{t,p}$ and $r^{-k}_{t,p}$.

Information on the order of joints may play a more important role in the sequence of a skeleton motion than in the case of a sentence or a video in that the position of each joint is meaningless until to which part of the body the joint belongs is known. The order of frames may also play an important role in detecting an action.

Therefore, the artificial intelligence model 100 may perform a tight positional embedding method that explicitly uses information on the order of joints in each of the N GL-transformer blocks 102.

Conventional transformer-based models apply positional embedding once before the first transformer block. In contrast, the artificial intelligence model 100 according to an embodiment applies positional embedding to the input tensors of all blocks.

Referring to FIG. 4(b), in each of the N GL-transformer blocks 102, positional embedding is applied to the spatial MHA module 1021 and the temporal MHA module 1022, respectively.

Hereinafter, the operation of the artificial intelligence model 100 for constructing a global and local attention mechanism that captures local dynamics between joints in the skeleton motion sequence and extracts global semantic information will be described.

The global and local attention (GLA) is implemented in both the spatial MHA module 3031 and the temporal MHA module 3032.

The spatial MHA module 3031 may fuse spatial information in each frame. Specifically, the spatial MHA module 3031 fuses joint-to-joint (local) information, joint-to-body (local-global) information, and body-to-body (person-to-person) information. The spatial MHA module 3031 may learn spatial dependency fused within each frame. In the spatial MHA module 3031, dependency from global (body) to local (joint) or from local (joint) to global (body) is learned by an attention operation between the features corresponding to $g_{t,p}$ and $R_{t,p}$ of each person.

In the same manner, dependency between global (person) and global (person) is learned by the attention between the features of several persons.

Here, $\{g_{t,p}, R_{t,p}|p=1, \ldots, P\}$, and P denotes the number of persons.

The temporal MHA module 3032 may fuse information on various time periods of the sequence. The temporal MHA module 3032 may learn temporal dependency across the sequence using pose features aggregated by the spatial MHA module 3031 through an attention operation.

The temporal MHA module 3032 may learn local joint dynamics from adjacent frames, as well as whole-body motion information from distant frames.

The input pose features of the spatial MHA module 3031 corresponding to the t-th frame of the n-th block may be expressed as $Z_t^n \in R^{PK\times D}$.

Referring to FIGS. 4(a) and 4(b), in the first block, embeddings of several persons are connected along the spatial attention axis as shown in [Equation 2] and [Equation 3] below.

$$Z_t^0 = \|_{p=1}^p Z_{t,p}^0 \quad \text{[Equation 2]}$$

$$Z_{t,p}^0 = \left[\bar{g}_{t,p}, r_{t,p}^{-1}, \ldots, r_{t,p}^{-K-1}\right]^T \quad \text{[Equation 3]}$$

Here, t denotes a natural number between 1 and T, T denotes the number of frames in the input sequence, and denotes a concatenation operation.

Hereinafter, the operation of the n-th GL-transformer block of generating an output from an input when n is a natural number between 2 and N will be described with reference to FIG. 6.

FIG. 6 is a flowchart showing step S3 in FIG. 5 in detail.

When the output $Z^{n-1}$ of the previous block is received, the n-th GL-Transformer block performs layer normalization on a result $Z_t^{n-1}+M_t$ of applying the t-th slice $M_t$ of the positional embedding tensor M corresponding to each frame $Z_t^{n-1}$ of the output of the previous block $LN(Z_t^{n-1}+M_t)$. The spatial MHA module of the n-th GL-Transformer block applies the spatial MHA to the result of the layer normalization (spatial−MHA(LN($Z_t^{n-1}+M_t$))). The n-th GL-Transformer block may derive a first result $S_t^n$ obtained by adding a result of applying the t-th slice $M_t$ of the positional embedding tensor M corresponding to each frame $Z_t^{n-1}$ of the output of the previous block to a result of applying the spatial MHA (spatial−MHA(LN($Z_t^{n-1}+M_t$))) (S31).

When n is 2 or more, the spatial MHA module 3031 of the n-th block receives the output $Z_t^{n-1}$ of the previous block. The spatial MHA module 3031 updates the pose function as shown in [Equation 4] below.

$$S_t^n = \text{spatial–}MHA(LN(Z_t^{n-1}+M_t))-(Z_t^{n-1}+M_t) \qquad \text{[Equation 4]}$$

Here, $M_t \in R^{PK \times D}$ is the t-th slice of the positional embedding tensor M, and LN( ) represents the layer normalization operator.

In the spatial MHA, the concept of the MHA in a positional embedding matrix may be used. Hereinafter, for simplicity, $LN(Z_t^{n-1}+M_t)$ will be expressed as $\hat{Z}_t^{n-1}$.

First, $\hat{Z}_t^{n-1}$ may be projected onto matrix Q having query Q, key K, and value V as shown in [Equation 5] below.

$$Q=\hat{Z}_t^{n-1}W^Q, K=\hat{Z}_t^{n-1}W^K, V=\hat{Z}_t^{n-1}W^V \qquad \text{[Equation 5]}$$

Here, $W^Q$, $W^K$, $W^V \in R^{PK \times D}$ is the weight matrix for the projection, and the projection dimension may be expressed as d. The artificial intelligence model 100 may determine each of $W^Q$, $W^K$, $W^V$ through pre-training.

The attention mechanism of the artificial intelligence model 100 may be expressed as shown in [Equation 6] below.

$$\text{Attention } (Q, K, V) = \text{softmax} \left( \frac{QK^T}{\sqrt{d}} \right)V \qquad \text{[Equation 6]}$$

Here, $QK^T$ represents inner similarity of each projected joint vector with respect to key K in query Q. A high attention weight is applied for high similarity. In the MHA, the i-th head performs the attention mechanism of [Equation 6] with other weight matrices $W_i^Q$, $W_i^K$, $W_i^V$ and weight matrices of other heads as shown in [Equation 7] below.

$$H_i=\text{Attention}(\hat{Z}_t^{n-1}W_i^Q, K=\hat{Z}_t^{n-1}W_i^K, V=\hat{Z}_t^{n-1}W_i^V)$$

Here, i denotes a natural number between 1 and h, and chained $H_i$ is projected onto the pose features aggregated as shown in [Equation 8] below, where $W_H \in R^{sh \times dh}$ is a projection matrix. The artificial intelligence model 100 may determine each of $W_i^Q$, $W_i^K$, $W_i^V$ through pre-training.

$$\text{spatial}-MHA(\hat{Z}_t^{n-1}) = \left( \|_{i=1}^h H_i \right)W_H \qquad \text{[Equation 8]}$$

To perform the temporal MHA in the n-th block, the pose features of the t-th frame $S_t^n \in R^{PK \times D}$ are vectorized into $s_t^n \in R^{PK \cdot D}$. Then, the vectorized pose features are stacked to form a pose feature sequence matrix $S^n=[s_1^n, s_2^n, \ldots, s_T^n]^T$. Although an MHA mechanism the same as shown in [Equation 8] is used in the temporal MHA module 3032, a different weight matrix is applied.

The n-th GL-Transformer block for each frame performs layer normalization on the result $S^n + \overline{M}$ of applying the matrix $\overline{M}$ with a changed dimension of the positional embedding tensor M to the pose sequence matrix $S^n$ in which the first result $S_t^n$ is stacked ($LN(S^n + \overline{M})$). The temporal MHA module of the n-th GL-Transformer block applies the temporal MHA to the layer normalization result (temporal–$MHA(LN(S^n + \overline{M}))$). The n-th GL-transformer block may derive a second result $\overline{Z}^n$ obtained by adding the result $S^n + \overline{M}$ of applying the matrix M with a changed dimension of the positional embedding tensor M to the pose sequence matrix $S^n$ to the result temporal–$MHA(LN(S^n + \overline{M}))$ of applying the spatial MHA as shown in [Equation 9] below (S32).

$$\overline{Z}^n = \text{temporal–}MHA(LN(S^n + \overline{M}))+(S^n + \overline{M}) \qquad \text{[Equation 9]}$$

Here, $\overline{M} \in R^{T \times (PK \cdot D)}$ is a matrix when the dimension of the positional embedding tensor $\overline{M} \in R^{T \times PK \times D}$ is changed.

The n-th GL-Transformer block performs layer normalization on the second result $\overline{Z}^n (LN(\overline{Z}^n))$. The n-th GL-transformer block may apply MLP to the layer normalization result $MLP(LN(\overline{Z}^n))$, and derive a third result $Z^n$ obtained by adding the second result $\overline{Z}^n$ to the result $MLP(LN(\overline{Z}^n))$ of applying the MLP (S33). Here, the third result $Z^n$ finally becomes the output of the n-th GL-transformer block.

The output pose sequence features of the n-th GL transformer $Z^n$ may be obtained through the MLP 304 as shown in [Equation 10] below.

$$Z^n = MLP(LN(\overline{Z}^n))+(\overline{Z}^n) \qquad \text{[Equation 10]}$$

The artificial intelligence model 100 may determine each of the parameters of the MLP 304 through pre-training.

Steps S31 to S33 described above are performed in each of the N GL-transformer blocks. In an embodiment, the embedding tensor M is applied not only to the first block among the transformer blocks, but also to each of the N GL-transformer blocks.

The N-th GL-transformer block may derive the final motion sequence representation F for the input motion sequence X by applying the second layer MLP 304 to the n-th third result $Z^n$ as shown in [Equation 11] below.

$$F=GL\text{—Transformer}(x)=MLP(Z^n) \qquad \text{[Equation 11]}$$

The motion sequence representation F may be input into the prediction layer 306 and output as a task-specific result.

Hereinafter, a masked attention for a motion sequence of a natural speed will be described.

To handle a motion sequence of a natural speed, in an embodiment, natural joint dynamics are learned throughout a frame, and attention masks are used to capture characteristics of speed from various motions. To this end, a maximum sequence length is defined, and when the length of the original sequence is shorter than the maximum sequence length, the remaining frames are filled with padding dummy tokens.

In the artificial intelligence model 100, the padding dummy tokens are set to a random number since losses of corresponding tokens are excluded. To exclude an attention from the dummy values, columns corresponding to the padding dummy tokens in matrix $QK^T$ are masked. For example, the artificial intelligence model 100 may set columns corresponding to the padding dummy token to minus infinity.

Hereinafter, a method of learning the global attention across a long sequence by an artificial intelligence model will be described.

For pre-training, a multi-interval pose displacement prediction (MPDP) strategy is used.

The artificial intelligence model 100 is trained with multiple tasks through MPDP and may simultaneously predict displacements of various poses across different intervals. Here, the displacements of various poses may be the angles and moving distances of all joints.

The artificial intelligence model 100 learns the local attention at small intervals and the global attention at large intervals. The artificial intelligence model 100 may apply a motion sequence of a natural speed, instead of a sequence sampled at a fixed length, to learn natural joint dynamics across the frames. In addition, the artificial intelligence model 100 may use information on the order of all blocks by repeatedly applying learnable spatial positional embedding and temporal positional embedding to each of the GL-transformer blocks. The information on the order of all blocks is very important information in a motion sequence.

Although an instantaneous speed of a joint at a particular frame may be easily obtained from adjacent frames and therefore guides the model to learn the local attention rather than the long-range global attention, the processor 120 allows the artificial intelligence model 100 to effectively learn the global attention, as well as the local attention, to overcome these limitations.

Figure 7:
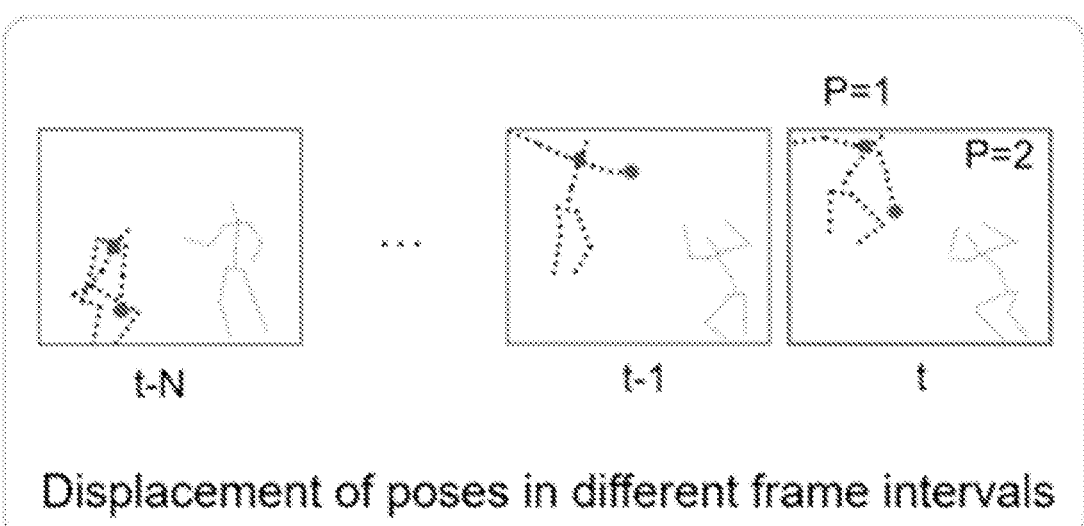
FIG. 7 is an exemplar view showing multiple frame intervals for explaining movements of an object.

FIG. 7 is an exemplar view showing multiple frame intervals for explaining movements of an object.

Referring to FIG. 7, the artificial intelligence model 100 may select multiple frame intervals $t-N, \ldots, t-n, \ldots, t$. The GL-Transformer layer 1001 may learn a method of predicting the direction and magnitude of pose displacement between the t-th frame and the (t−n)-th frame. Local motions representing the relative joint displacement may be predicted with the help of global motions, and the global motions may also be predicted with the help of local motions. In addition, when predicting movements of a person, movements of the other persons are also considered.

Figure 8:
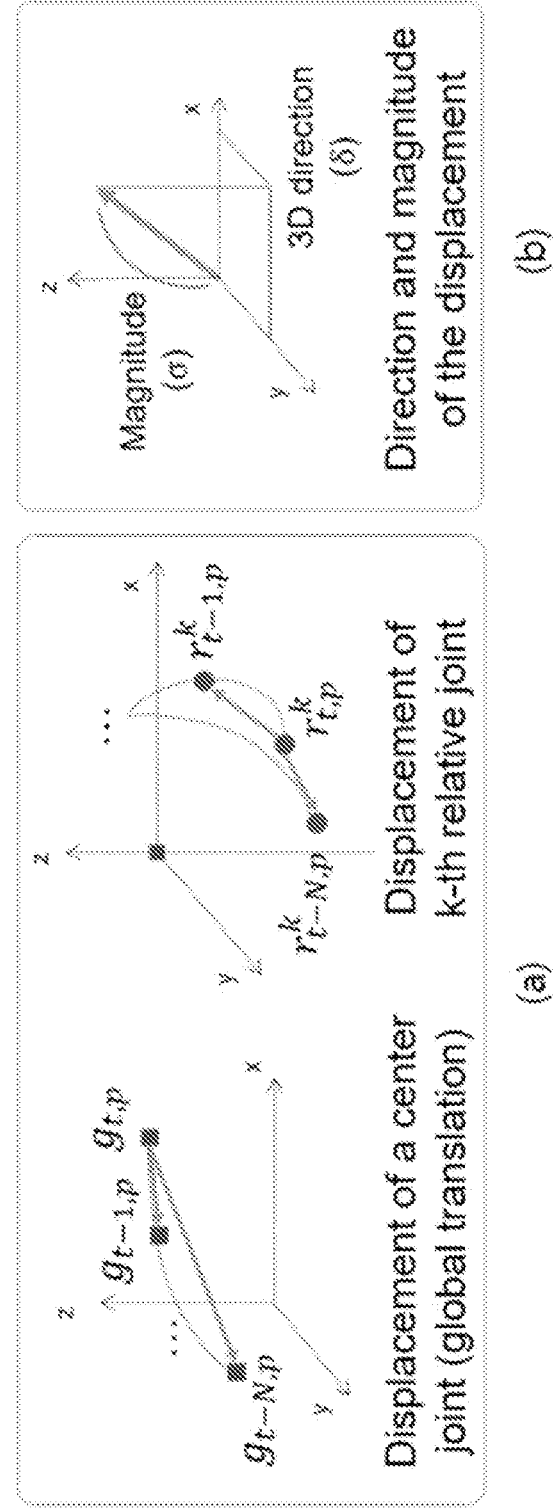
FIG. 8 illustrates an exemplar view (a) for explaining displacement of a center joint and displacement of a k-th joint of the object in FIG. 7, and an exemplar diagram (b) for explaining the direction and magnitude of the displacement of the object in FIG. 7.

FIG. 8($a$) is an exemplar view for explaining displacement of a center joint and displacement of a k-th joint of the object in FIG. 7. FIG. 8($b$) is an exemplar diagram for explaining the direction and magnitude of the displacement of the object in FIG. 7.

In FIGS. 8($a$) and 8($b$), pose displacements of the object shown in FIG. 7 are shown as arrows.

The classification task of each of the pose displacement magnitude prediction layer 1002 and the pose displacement direction prediction layer 1003 may be implemented using a linear classifier to which softmax is applied. The artificial intelligence model 100 may be trained to predict both the direction and magnitude in each interval. Prediction of the t-th frame for interval n may be expressed as shown in [Equation 12] below.

$$\hat{\Delta}_{t,n} = \text{softmax}(W^{\delta}_{n}F_t + b^{\delta}_n), \hat{\Sigma}_{t,n} = \text{softmax}(W^{\delta}_{n}F_t + b^{\delta}_n) \quad \text{[Equation 12]}$$

Here, $F_t$ is the t-th slice of the motion sequence representation F.

$$\hat{\Delta}_{t,n} = \|_{p-1}^{p} \hat{\Delta}_{t,p,n},$$

and here, $$\hat{\Delta}_{t,p,n} = \left[\hat{\delta}^g_{t,p,n}, \hat{\delta}^1_{t,p,n}, \ldots, \hat{\delta}^{K-1}_{t,p,n}\right]^T.$$

In addition, $$\hat{\delta}^g_{t,p,n} \text{ and } \hat{\delta}^k_{t,p,n} \in R^{C_\delta}$$

represents a direction class vector predicted from the global translation vector and a direction class vector predicted from the k-th joint vector, respectively, and k is a natural number between 1 and K−1. $C_\delta$ denotes the number of direction classes.

$$\hat{\Sigma}_{t,n} = \|_{p-1}^{p} \hat{\Sigma}_{t,p,n},$$

and here, $$\hat{\Sigma}_{t,p,n} = \left[\hat{\sigma}^g_{t,p,n}, \hat{\sigma}^1_{t,v,n}, \ldots, \hat{\sigma}^{K-1}_{t,p,n}\right]^T.$$

In addition, $$\hat{\sigma}^g_{t,p,n} \text{ and } \hat{\sigma}^k_{t,p,n} \in R^{C_\sigma}$$

represents a magnitude class vector predicted from the global translation vector and a magnitude class vector predicted from the k-th joint vector, respectively, and k is a natural number between 1 and K−1. $C_\sigma$ denotes the number of magnitude classes.

$W_n^{\delta}$, $W_n^{\sigma}$, $b_n^{\delta}$, $b_n^{\sigma}$ are learnable weights and biases for interval n.

In order to learn the parameters of the artificial intelligence model 100, the pre-training server 10 may define actual classes of direction δ and magnitude σ in the t-th frame for interval n and the p-th person as shown in [Equation 13] and [Equation 14] below.

$$\delta^g_{t,p,n} = \text{class}(\angle(g_{t,p} - g_{(t-n),p})), \delta^k_{t,p,n} = \\ \text{class}(\angle(r^k_{t,p} - r^k_{(t-n),p})) \quad \text{[Equation 13]}$$

$$\sigma^g_{t,p,n} = \text{class}(\|(g_{t,p} - g_{(t-n),p})\|), \sigma^k_{t,p,n} = \\ \text{class}(\|(r^k_{t,p} - r^k_{(t-n),p})\|) \quad \text{[Equation 14]}$$

Here, since there is no information about the (t−n)-th frame, $g_{(t-n),p} = g_{t,p}$ at $t \leq n$, and $r^k_{(t-n),p} = r^k_{t,p}$ may be set. class (A) represents the class label vector of A, where the magnitude is quantized to one of $C_\sigma$ classes and the direction is specified to any one of $C_\delta = 27$ classes. Here, 27 classes include three classes of +, −, and no movement for each of x-axis, y-axis, and z-axis directions.

The prediction layer 106 may calculate classification loss in all sections and frames except for [PAD] tokens. The [PAD] tokens are special padding tokens that adjust the length of an input target to be equal in a deep learning model.

The total loss may be defined as shown in [Equation 15] below.

$$L_{total} = \sum_{r=1}^{T} \sum_{p=1}^{p} \sum_{n}^{N} (\lambda_\delta L_\delta(t, p, n) + \lambda_\sigma L_\sigma(t, p, n)) \quad \text{[Equation 15]}$$

Here, direction loss $L_\delta(t,p,n)$ and magnitude loss $L_\sigma(t,p,n)$ represent the sum of weights of cross-entropy loss that is for training each component of $\hat{\Delta}_{t,p,n}$ and $\hat{\Sigma}_{t,p,n}$. In addition, $\lambda_\delta$ and $\lambda_\sigma$ represent the weights of $L_\delta$ and $L_\sigma$, respectively.

In this way, the artificial intelligence model 100 may be pre-trained through the above operations. The artificial intelligence model 100 learns global and local attentions and effectively captures global context and local dynamics of a sequence. In an embodiment, although the artificial intelligence model may be implemented in an unsupervised learning method, it shows excellent performance in the task of recognizing downstream actions even in a supervised learning method. Parameters determined by the artificial intelligence model 100 in the pre-training may be transferred to the transfer learning server 20 to be used in the task of downstream. The parameters determined in the pre-training may include the parameters of [Equation 1] to [Equation 11] and the weights determined by pre-training through [Equation 1] to [Equation 11].

When the parameters determined in the pre-training are transferred, the transfer learning server 20 may apply the artificial intelligence model 101 to which the parameters determined in the pre-training are applied. As described above, the artificial intelligence model 101 may include a pre-trained GL-transformer layer 1001 and at least one new prediction layer. The artificial intelligence model 101 may learn at least one newly added layer, excluding the prediction layer ( ) determined among the artificial intelligence models 100 through [Equation 12]. The transfer learning server 20 may perform various downstream tasks that deal with behaviors of objects using the artificial intelligence model 101.

In order to utilize the artificial intelligence model 101 for various tasks, the transfer learning server 20 may determine the layers included in the artificial intelligence model 101 to be different for each task. The transfer learning server may learn the artificial intelligence model 101 based on the parameters determined in the pre-training of the pre-trained artificial intelligence model 100 in order to perform detailed learning for individual tasks. The artificial intelligence model 101 may be applied to various tasks related to understanding of videos. The transfer learning server 20 may learn using the parameters determined in the pre-training of the artificial intelligence model 100 while fixing them as they are.

The transfer learning server 20 may utilize the artificial intelligence model 101 for various tasks such as action classification, abnormal behavior detection, event section search, and the like. The artificial intelligence model 101 may include at least one among a first artificial intelligence model 101_1 whose downstream task is action classification, a second artificial intelligence model 101_2 whose downstream task is abnormal behavior detection, and a third artificial intelligence models 101_3 whose downstream task is event section search. The first artificial intelligence model 101_1, the second artificial intelligence model 101_2, and the third artificial intelligence model 101_3 are examples, and the present invention is not limited thereto. The artificial intelligence model 101 may be one of models including the GL-Transformer layer 1011 and at least one new layer to perform various downstream tasks that deal with behaviors of objects from videos.

The first artificial intelligence model 101_1 may include a GL-transformer layer 1011 and at least one new first layer. The transfer learning server 20 may train the first artificial intelligence model 101_1 to estimate the type of an action. The second artificial intelligence model 101_2 may include a GL-Transformer layer 1011 and at least one new second layer. The transfer learning server 20 may train the second artificial intelligence model 101_2 to estimate whether a behavior of an object included in a video is an abnormal behavior or a normal behavior. The third artificial intelligence model 101_3 may include a GL-Transformer layer 1011 and at least one new third layer. When an action type is labeled for each time section in a video, the transfer learning server 20 trains the third artificial intelligence model 101_3 using data including the video, so that a section in which an event is issued and the action type of the section may be output when a video is input into the learned artificial intelligence model 101.

Alternatively, the transfer learning server 20 may learn using the parameters determined in the pre-training of the artificial intelligence model 100 as initial values of the learning without fixing them. When the amount of data to be used by the transfer learning server 20 is very small, or in order to quickly update the artificial intelligence model 101 with only a small number of operations, it may be learned so that even the parameters determined in the pre-training of the artificial intelligence model 100 may be changed.

The transfer learning server 20 may infer individual tasks by inputting video data into the learned artificial intelligence model 101.

Although not shown in FIG. 1, the transfer learning server 20 may include a processor, a memory for loading computer programs executed by the processor, and a storage for storing the computer programs. The memory 110 and the memory of the transfer learning server 20 store various types of data, instructions, and/or information. The memory 110 and the memory of the transfer learning server 20 may load one or more programs from the storage to execute methods according to embodiments of the present invention. The memory 110 and the memory of the transfer learning server 20 may be implemented as volatile memory such as RAM, but the technical scope of the present invention is not limited thereto.

The memory 110 and the storage of the transfer learning server 20 may non-temporarily store the one or more programs and various types of data. The memory 110 and the storage of the transfer learning server 20 may be configured to include non-volatile memory such as Read Only Memory (ROM), Erasable Programmable ROM (EPROM), Electrically Erasable Programmable ROM (EEPROM), flash memory, and the like, hard disk, detachable disk, or any type of computer-readable recording medium well known in the technical field to which the present invention belongs. Computer programs of each of the pre-training server 10 and the transfer learning server 20 may include one or more instructions that control, when loaded onto the memory, the processor to perform methods and operations according to various embodiments of the present invention. That is, the processor may perform methods and operations according to various embodiments of the present invention by executing the one or more instructions.

The embodiments of the present invention described above may be implemented through a variety of means. For example, the embodiments of the present invention may be implemented by hardware, firmware, software, or a combination thereof.

In the case of implementation by hardware, the methods according to the embodiments of the present invention may be implemented by one or more among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the methods according to the embodiments of the present invention may be implemented in the form of a module, a procedure, a function, or the like that performs the functions or operations described above. Software codes may be stored in a memory unit and driven by a processor. The memory unit is located inside or outside the processor and may exchange data with the processor through various known means.

Although the embodiments of the present invention have been described above, the present invention is not limited to the above embodiments, and may be implemented to be variously modified within the scope of the detailed description and accompanying drawings as long as it does not deviate from the spirit of the present invention and does not impair the effect. In addition, it is natural that such embodiments fall within the scope of the present invention.

DESCRIPTION OF SYMBOLS

1: Video processing system
10: Pre-training server
110: Memory
120: Processor
130: Collection unit
140: Preprocessing unit
150: Communications unit
20: Transfer learning server
100: Artificial intelligence model
1001: GL-Transformer layer
1002: Pose displacement magnitude prediction layer
1003: Pose displacement direction prediction layer
101: Artificial intelligence model
1011: GL-Transformer layer
1012: Linear classifier
300: Artificial intelligence model
3011: Global translation embedding layer
3012: Joint embedding layer
302: Trainable positional embedding
303: N GL-transformer blocks
3031: Spatial MHA module
3032: Temporal MHA module
304: Multilayer Perceptron
305: Motion sequence representation
306: Prediction layer

What is claimed is:

1. A video processing method performed by a computing device, the method comprising the steps of:
   collecting video from an external device;
   generating preprocessed data by extracting two-dimensional or three-dimensional skeleton information from the video;
   pre-training a first artificial intelligence model including N transformer blocks from the preprocessed data by applying an attention from a body of an object to a plurality of joints, an attention from each of the plurality of joints to the body, and an attention between persons; and
   learning, when parameters determined as a result of the pre-training of the first artificial intelligence model are transferred, a method of recognizing an action from the video received from the external device, using a second artificial intelligence model including the N transformer blocks on the basis of the parameters, wherein
   N is a natural number equal to or larger than 2.

2. The method according to claim 1, wherein the step of pre-training a first artificial intelligence model includes the steps of:

applying a slice of a positional embedding tensor corresponding to each frame of an output of a previous block, and performing first layer normalization, by an n-th transformer block among the N transformer blocks;
   applying a spatial multi-head attention (MHA) to a result of the first layer normalization, by the n-th transformer block; and
   deriving a first result by adding a result of applying the slice of a positional embedding tensor corresponding to each frame of an output of a previous block to a result of applying the spatial MHA, by the n-th transformer block, wherein
   n is a natural number between 2 and N.

3. The method according to claim 2, further comprising the steps of:
   applying a matrix with a changed dimension of the positional embedding tensor to a pose sequence matrix in which the first result corresponding to each frame is stacked, and performing second layer normalization;
   applying a temporal MHA to a result of the second layer normalization; and
   deriving a second result by adding a result of applying the matrix with a changed dimension of the positional embedding tensor to a pose sequence matrix to a result of applying the temporal MHA.

4. The method according to claim 3, further comprising the steps of:
   performing third layer normalization on the second result;
   applying a multi-layer perceptron (MLP) to a result of the third layer normalized; and
   deriving a third result by adding the second result to a result of applying the MLP.

5. The method according to claim 1, further comprising the step of deriving a motion sequence representation for an input motion sequence according to the video, by an N-th block among the N transformer blocks.

6. A pre-training server comprising:
   a processor;
   a memory; and
   a computer program loaded on the memory and executed by the processor, wherein
   the computer program includes:
   an instruction for collecting video from an external device;
   an instruction for generating preprocessed data by extracting two-dimensional or three-dimensional skeleton information from the video;
   an instruction for pre-training a first artificial intelligence model including N transformer blocks from the preprocessed data by applying an attention from a body of an object to a plurality of joints, an attention from each of the plurality of joints to the body, and an attention between persons; and
   an instruction for learning, when parameters determined as a result of the pre-training of the first artificial intelligence model are transferred, a method of recognizing an action from the video received from the external device, using a second artificial intelligence model including the N transformer blocks on the basis of the parameters, wherein
   N is a natural number equal to or larger than 2.

* * * * *